United States Patent
Pagan

(10) Patent No.: US 8,020,096 B2
(45) Date of Patent: Sep. 13, 2011

(54) METHOD AND SYSTEM FOR PROVIDING INTEGRATED HOT KEY CONFIGURATION

(75) Inventor: William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 2078 days.

(21) Appl. No.: 10/602,425

(22) Filed: Jun. 24, 2003

(65) Prior Publication Data

US 2004/0263480 A1   Dec. 30, 2004

(51) Int. Cl.
*G06F 3/048* (2006.01)
*G06F 9/45* (2006.01)
*G06F 3/02* (2006.01)

(52) U.S. Cl. .................... 715/711; 715/827; 715/847

(58) Field of Classification Search .............. 715/847, 715/711, 827; 345/172
See application file for complete search history.

(56) References Cited

U.S. PATENT DOCUMENTS

| | | | | |
|---|---|---|---|---|
| 5,973,688 A * | 10/1999 | May | ............................. | 715/709 |
| 5,999,895 A * | 12/1999 | Forest | ............................. | 704/1 |
| 6,005,928 A | 12/1999 | Johnson | | |
| 6,020,889 A * | 2/2000 | Tarbox et al. | .................. | 715/736 |
| 6,934,778 B2 * | 8/2005 | Numano | .......................... | 710/67 |
| 7,015,898 B2 * | 3/2006 | Wang | ............................. | 345/168 |
| 2002/0070924 A1 | 6/2002 | Petersen | | |
| 2002/0090062 A1 | 7/2002 | Alhadad et al. | | |
| 2003/0090471 A1 * | 5/2003 | Slaunwhite et al. | .......... | 345/172 |
| 2004/0239637 A1 * | 12/2004 | Williams et al. | ............... | 345/172 |

FOREIGN PATENT DOCUMENTS

JP   7319569 A   12/1995

OTHER PUBLICATIONS

"Context (computing)," http://en.wikipedia.org/wiki/Context_%28Computing%29.*
Wilkowski, Ruth; Using hot key shortcuts to streamline your system; Jun. 1, 2002; Courier—Islander, p. A4.*

* cited by examiner

*Primary Examiner* — Chat C Do
*Assistant Examiner* — Jordany Nunez
(74) *Attorney, Agent, or Firm* — Cynthia G. Seal; Jeffrey L. Streets

(57) ABSTRACT

A method and system for providing a hot key corresponding to a particular function in a computer system is disclosed. The computer system has a graphical user interface (GUI) and a context in which the particular function is provided. The method and system include integrating a hot key configuring function into the GUI such that a user can access the hot key configuring function from the context. The method and system further allow a user to utilize the hot key configuring function in the context to map the hot key to the particular function.

32 Claims, 5 Drawing Sheets

METHOD AND SYSTEM FOR PROVIDING INTEGRATED HOT KEY CONFIGURATION

FIELD OF THE INVENTION

The present invention relates to computer systems, and more particularly to a method and system for providing an integrated mechanism for configuring hot keys.

BACKGROUND OF THE INVENTION

FIGS. 1A and 1B depict aspects of a conventional computer system 10. The computer system includes a display 12 having a graphical user interface (GUI) 13, a memory 14, a processor 16, and one or more input/output (I/O) devices 17 (in addition to the display 12), such as a mouse. The computer system also includes an operation system 18 and applications 20, 22, and 24. The applications 20, 22, and 24 each have one or more corresponding contexts.

In utilizing the conventional computer system 10, a user may wish to employ hot keys. A hot key is some combination of keys that provides a short cut to a particular function when the user is utilizing a particular application 20, 22, and 24. The applications 20, 22, and 24 may come with certain hot keys already configured. For example, suppose that the application 20 is a word processing application. In the context of the word processing application 20, a hot key may be used to access a particular font or format for the font. Text may be bolded, for example, by a user pressing <ctrl><b>. The key combination of <ctrl><b> is the hot key for the function of bolding text.

Although the applications 20, 22, and 24 may have some hot keys, one of ordinary skill in the art would readily recognize that the user may desire to remap the existing hot keys to new hot keys. In addition, the user may wish to provide additional hot keys. Remapping the hot keys for an application 20, 22, and 24 allows the user to configure applications 20, 22, and 24 in a manner that is most intuitive to the user.

FIG. 2 depicts a conventional method 50 for mapping hot keys in the computer system 10. A conventional hot key menu is accessed, via step 52. The conventional hot key menu is typically a new screen separate from the context, or application 20, 22, and 24, in which the user may be working. Thus, step 52 typically entails the user exiting the context in which the user was working (if any), to enter the hot key menu. Once in the hot key menu, the user selects the function for which the hot key is desired, via step 54. Typically, step 54 is performed by the user clicking on a particular function in a list of functions for which hot keys can be mapped. The user then selects the key combination that is to correspond to the hot key for the function, via step 56. Stated differently, the user selects the key combination that is to become the hot key in step 56. The key combination is mapped to the function, via step 58. Consequently, the hot key is remapped. The user then exits the hot key menu and returns to the context in which they were previously working, via step 60. Thus, the user can remap hot keys for various applications using a hot key menu.

Although the conventional method 50 functions, one of ordinary skill in the art will readily recognize that a user must access the conventional hot key menu in order to map the hot keys to a particular function. Consequently, the user must stop the work they are currently doing in the application 20, 22, or 24 to access the conventional hot key menu. In addition, the hot key menu might include a long list of functions that may be unrelated to the particular function or application 20, 22, and 24 for which the user wishes to provide a hot key. Thus, selecting the function in step 54 may be difficult and time consuming.

Accordingly, what is needed is a system and method for more efficiently mapping hot keys for various applications in the computer system. The present invention addresses such a need.

SUMMARY OF THE INVENTION

The present invention provides a method and system for providing a hot key corresponding to a particular function in a computer system. The computer system has a graphical user interface (GUI) and a context in which the particular function is provided. The method and system comprise integrating a hot key configuring function into the GUI such that a user can access the hot key configuring function from the context. The method and system further allow a user to utilize the hot key configuring function in the context to map the hot key to the particular function.

According to the system and method disclosed herein, the present invention provides a mechanism for more efficiently mapping hot keys.

DETAILED DESCRIPTION OF THE INVENTION

The present invention relates to an improvement in computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for providing a hot key corresponding to a particular function in a computer system. The computer system has a graphical user interface (GUI) and a context in which the particular function is provided. The method and system comprise integrating a hot key configuring function into the GUI such that a user can access the hot key configuring function from the context. The method and system further allow a user to utilize the hot key configuring function in the context to map the hot key to the particular function.

The present invention will be described in terms of a particular computer system having particular components. However, one of ordinary skill in the art will readily recognize that this method and system will operate effectively for other computer systems having other and/or additional components. The present invention is also described in the context of methods having particular steps. However, one of ordinary skill in the art will readily recognize that the present invention operates effectively for other methods having additional and/or different steps.

Figure 1A:
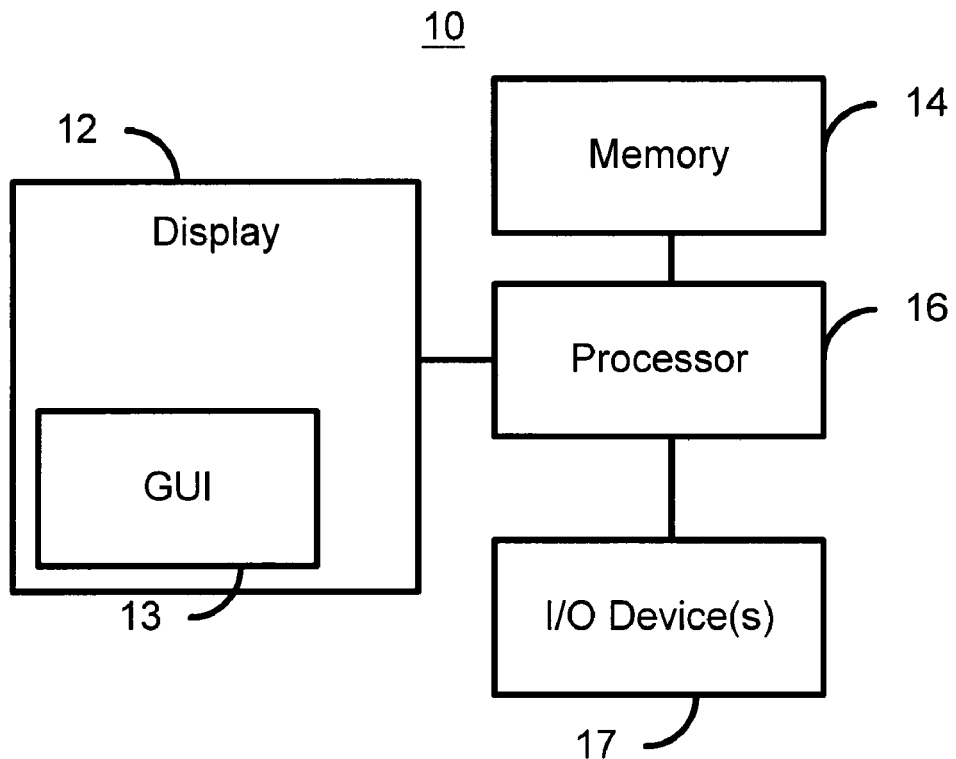
FIGS. 1A and 1B are diagrams of a conventional computer system.
Figure 1B:
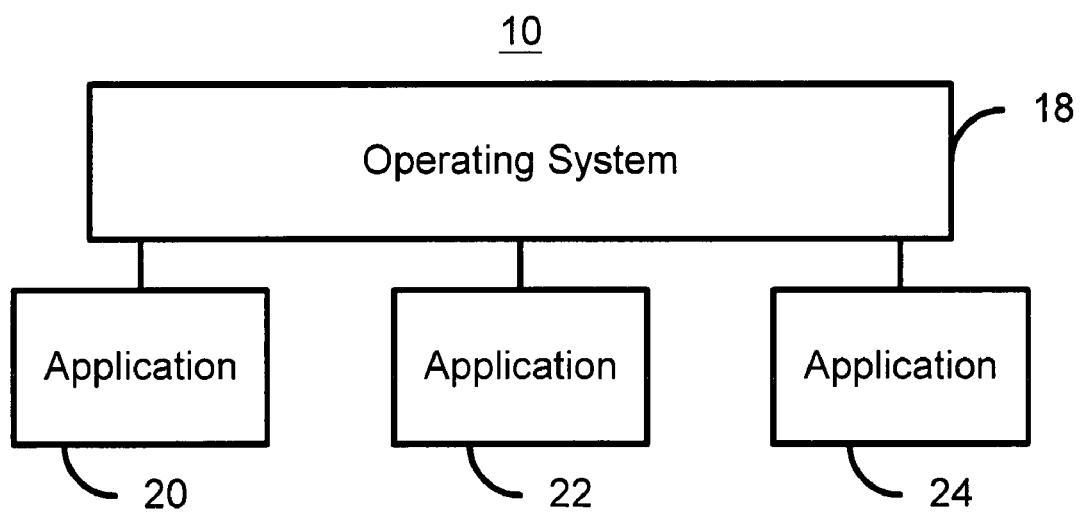
Figure 2:
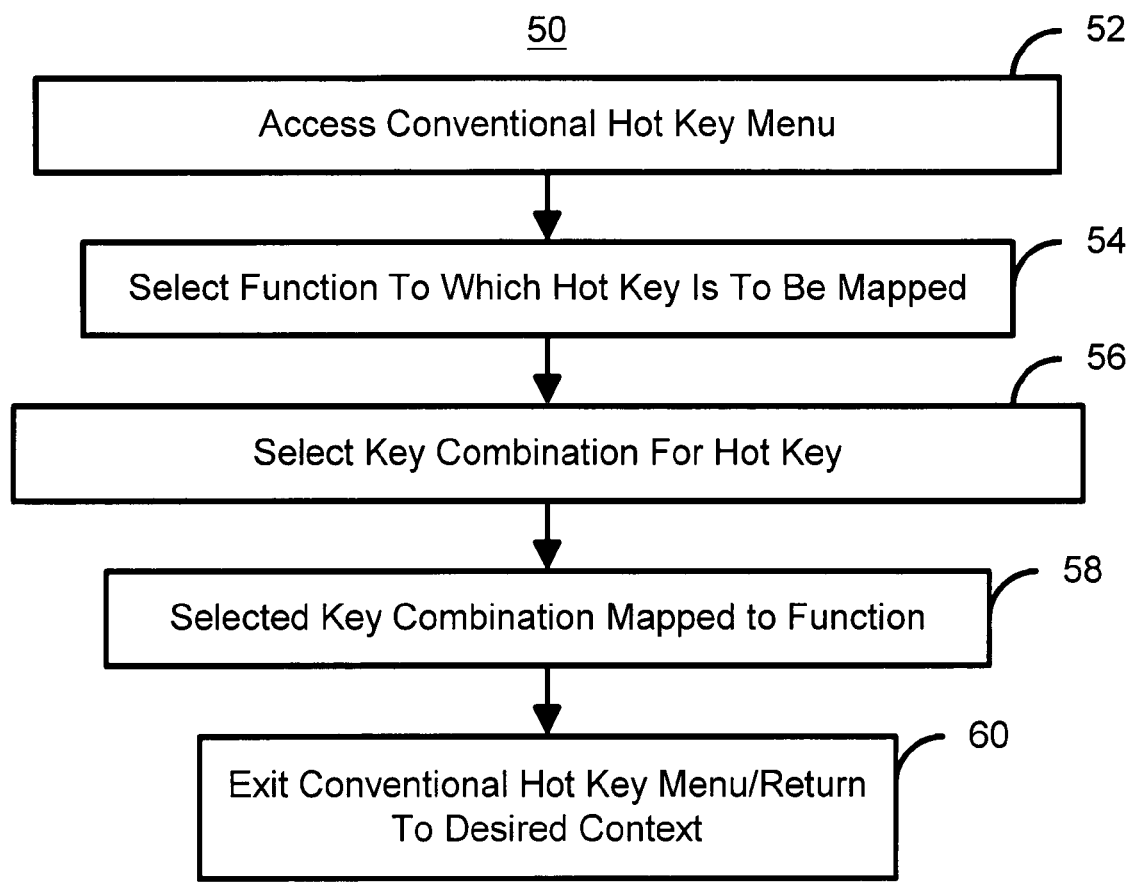
FIG. 2 is a flow chart depicting a conventional method for configuring hot keys.
Figure 3A:
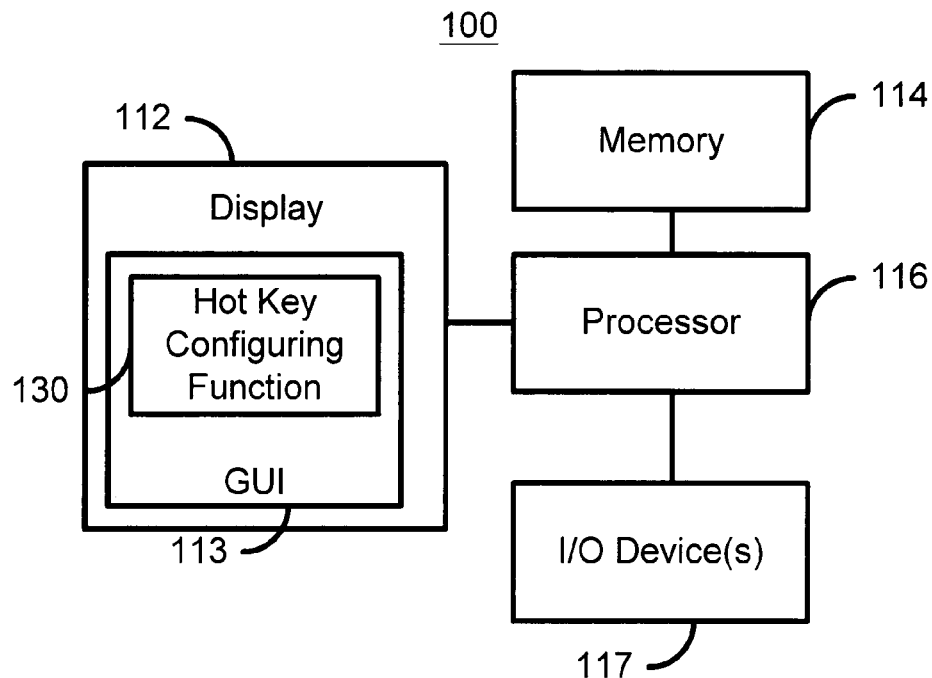
FIGS. 3A-3B are diagrams of one embodiment of a computer system for configuring hot keys in accordance with the present invention.
Figure 3B:
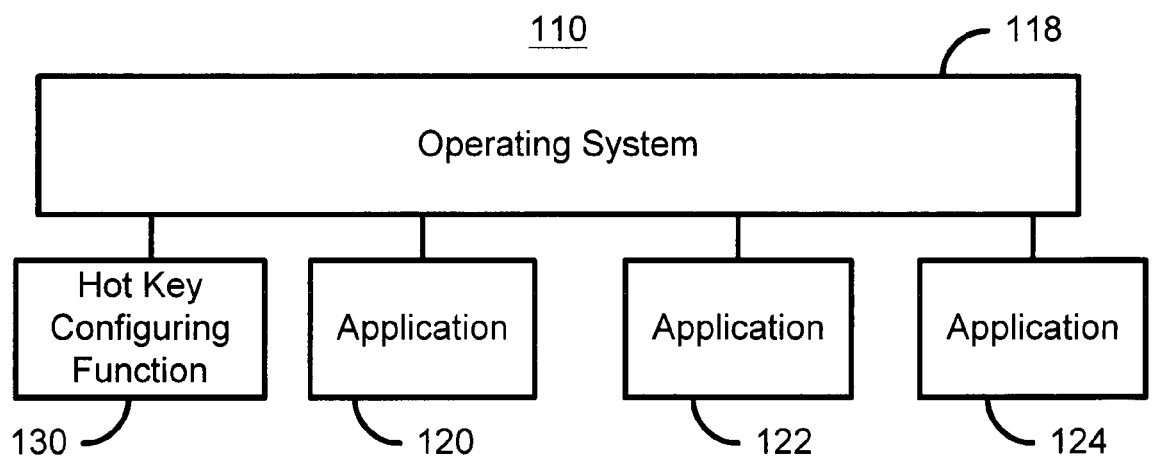

To more particularly illustrate the method and system in accordance with the present invention, refer now to FIGS. 3A and 3B, depicting one embodiment of a computer system 100 for configuring hot keys in accordance with the present invention. The computer system has many of the same components as the computer system 100. Consequently, such components are labeled similarly. The computer system 100 thus includes a display 112 utilizing a GUI 113, a memory 114, a processor 116, and I/O device(s) 117. The computer system 100 also includes an operating system 118 and applications 120, 122, and 124, each of which provides particular context(s) for the user to work in. For example, if the application 120 is a word processing program, one context could depict the text being entered by the user and could have buttons that allow for different formats for the text. In addition, the application 120 could provide a print context that includes a selection of printers, but not buttons for different text formats.

The computer system 100 also includes a hot key configuring function 130 that is integrated into the GUI 113 and is thus available in at least some of the contexts provided by the applications 120, 122, and 124. The hot key configuring function 130 allows a user to configure, or map, hot keys to particular functions available in the contexts without leaving the context. As a result, the user is able to configure new hot keys or reconfigure pre-existing hot keys to a new key combination without leaving the context in which the user is working. Consequently, the efficiency of mapping hot keys the computer system 100 is improved.

Figure 4:
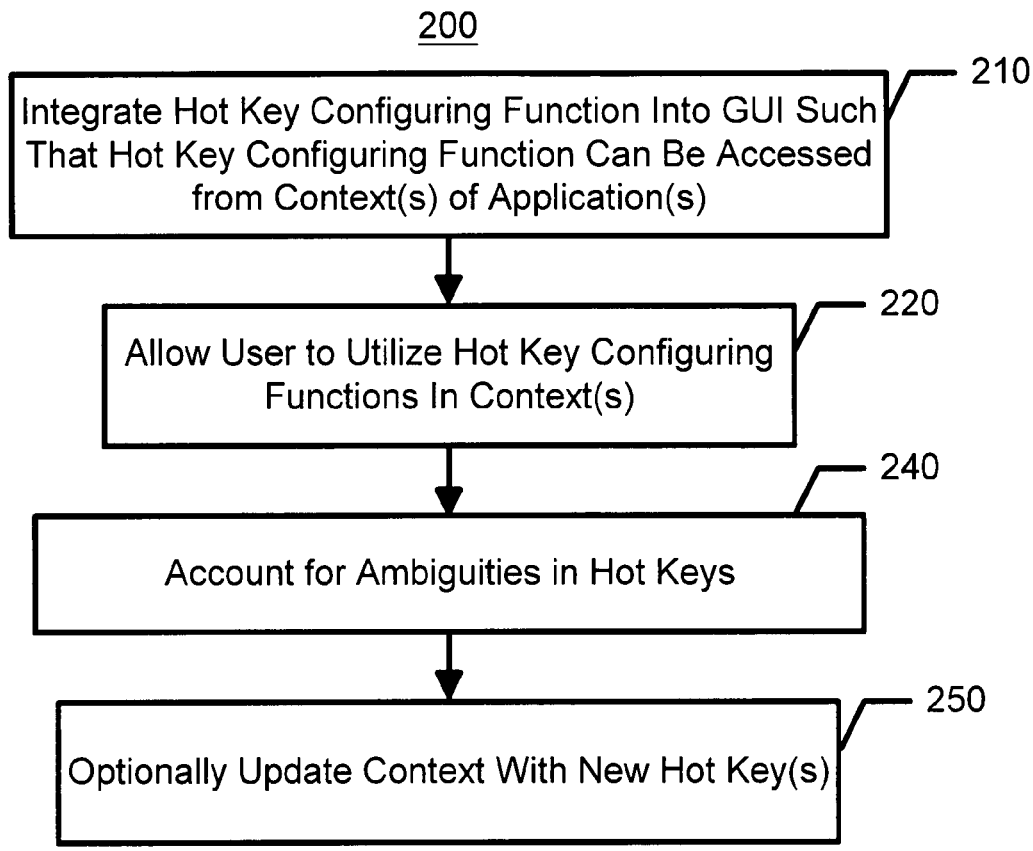
FIG. 4 is a high level flow chart depicting one embodiment of a method in accordance with the present invention for configuring hot keys.

FIG. 4 is a high level flow chart depicting one embodiment of a method 200 for configuring hot keys in accordance with the present invention. The method 200 is described in the context of the computer system 100. However, nothing prevents the use of the method 200 by another computer system.

The hot key configuring function 130 is integrated into the GUI 113 such that the hot key configuring function 130 is available within the contexts provided by one or more of the applications 120, 122, and 124, via step 210. A user of the computer system 100 is allowed to utilize the hot key configuring function 130 within the context in which a user is already working, via step 220. More specifically, step 220 allows a user that is working in an application 120, 122, and/or 124 to use the hot key configuring function 130 while in a context provided by the application 120, 122, and/or 124. The user can map a new hot key to a function in the application 120, 122, and/or 124 and/or remap the function to a new hot key. Consequently, the user can select the combination of keys corresponding to a particular function in the context(s) provided by the applications 120, 122, and/or 124. Moreover, the user can do so without leaving the context(s) provided by the applications 120, 122, and/or 124. The hot key configuring function 130 accounts for any ambiguities in the key combination selected by the user, via step 240. Accounting for ambiguities preferably has two different aspects. First, the hot key configuring function 130 ensures that a particular combination of keys (i.e. hot key) corresponds to only one function in a particular context. Consequently, the same key combination cannot be used to access two different functions.

Second, the hot key configuring function 130 ensures that a particular indication to map a hot key is not ambiguous In other words, in step 240, the hot key configuring function 130 ensures that a combination of keys used to access the hot key configuring function 130 and map a particular function to a hot key is not already used to perform a function in the context. Thus, an indication to map a hot key does not resemble an indication to perform any other function within the application's current context. The context may then be optionally updated to reflect the new hot key(s), via step 250. For example, tool tip values or underlined letters in a text-based item (described below) might be updated to inform the user of the new hot key to which the function has been mapped.

Using the method 200, a user can customize hot keys provided in the context(s) of the applications 120, 122, and/or 124 without leaving the context in which the user is working. As a result, the configuring of hot keys is made more efficient.

Figure 5:
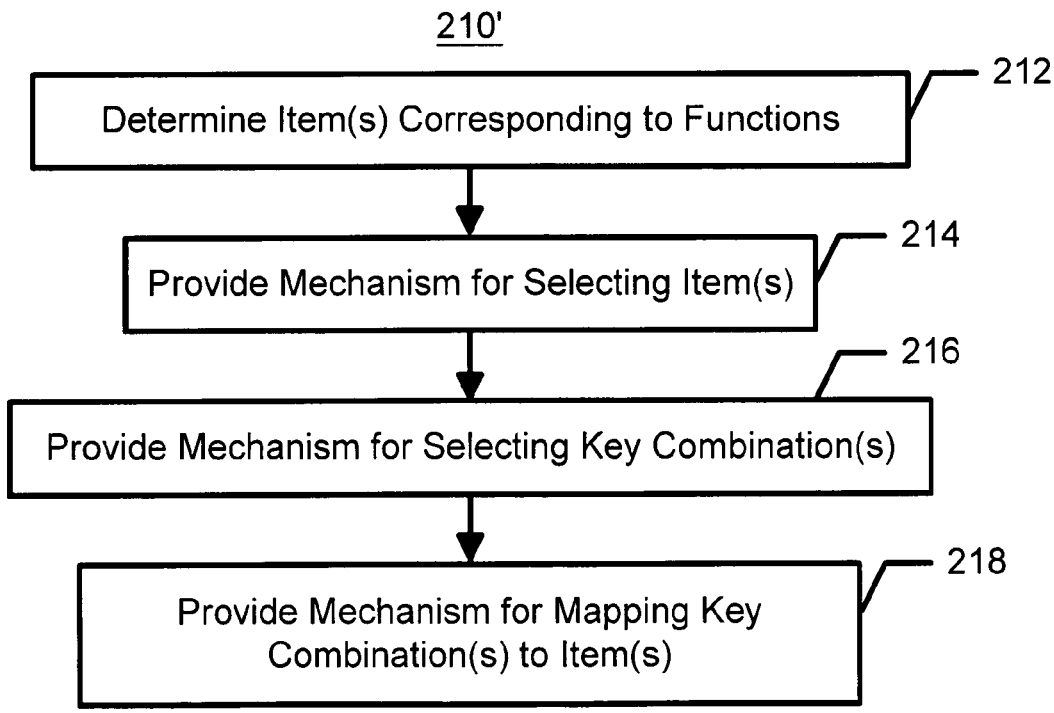
FIG. 5 is a high-level flow chart depicting one embodiment of a method for in accordance with the present invention for integrating a hot key configuring function into the GUI.

FIG. 5 is a high level flow chart depicting one embodiment of a method 210' in accordance with the present invention for integrating the hot key configuring function 130 into the GUI 113. The method 210' is preferably used to perform the step 210 of the method 200. The method 210' is described in the context of the computer system 100. However, nothing prevents the use of the method 210' by another computer system.

The items in, or components of, the GUI 113 corresponding to particular functions in a given context are determined, via step 212. For example, step 212 determines the buttons, menus, or other portions of the GUI 113 that are used in a particular context to access certain functions. For example, in one context provided by a word processing application, step 212 might determine which buttons for bold, underline, italics, and text justification. Step 212 might also determine the menus that can be used in the context to access other (or the same) functions. A mechanism for selecting the items in order to configure the hot keys for the corresponding functions is provided, via step 214. In a preferred embodiment, the mechanism utilizes the mouse and a hover action. A hover action occurs when the mouse is moved over the item and remains over the item for a particular amount of time, such as a few seconds. Thus, in a preferred embodiment, the item is selected when a hover action is performed over the item. In another embodiment, the item could be selected by clicking the mouse on the item or in another manner.

A mechanism for allowing the user to select the key combination for the hot key is provided, via step 216. In a preferred embodiment, the mechanism provided in step 216 allows the user to utilize the ALT key to indicate the key combination. However, another mechanism might be selected. A mechanism for mapping the function corresponding to the selected item to the key combination selected for the hot key is provided, via step 218. The mapping mechanism provided in step 218 also preferably accounts for ambiguities in the key combinations. Thus, the mechanism provided in step 218 preferably ensures that a particular key combination corresponds to only one function. In one embodiment, the mechanism provided in step 218 includes rules that only allow a user to select a key combination that does not correspond to another hot key. In another embodiment, the mechanism provided in step 218 includes rules that delete another hot key that has the same key combination as selected by the user. In such an embodiment, a user may be warned that the other, pre-existing hot key is to be deleted. In yet another embodiment, the mechanism provided in step 218 may require that the user perform a hover action in addition to entering the selected key combination if the key combination also corresponds to a pre-existing hot key. Thus, the hot key configuring function 130 provided using the method 210' not only allows a user to configure the hot keys in a particular context, but also preferably ensures that there are no ambiguities.

Figure 6A:
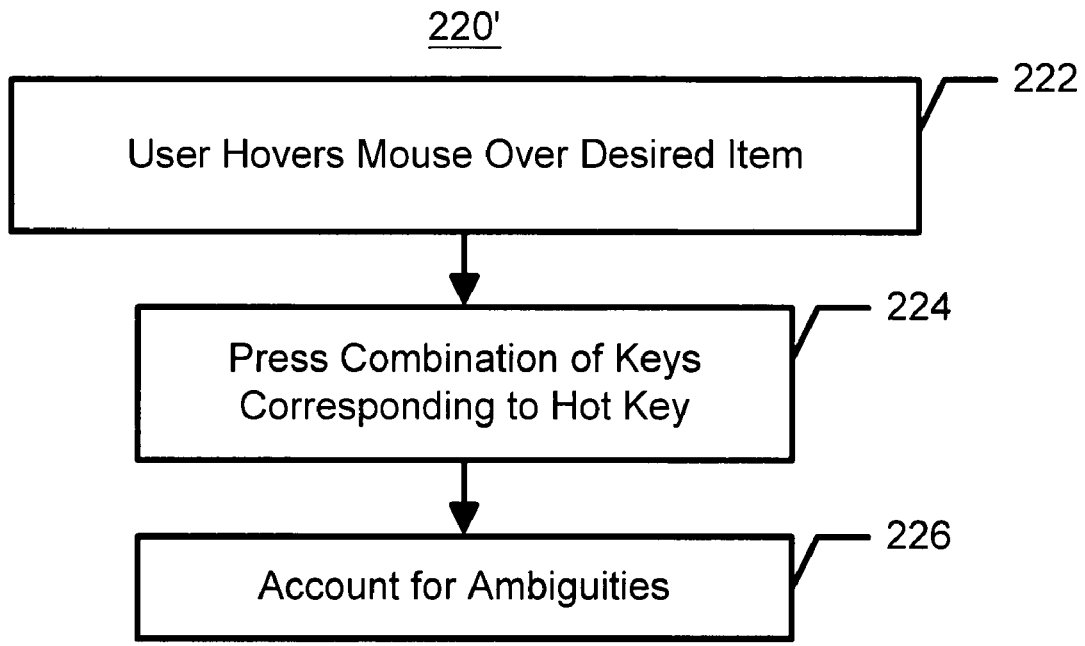
FIG. 6A is a more detailed flow chart of one embodiment of a method in accordance with the present invention for configuring hot keys.

FIG. 6A is a more detailed flow chart of one embodiment of a method 220' in accordance with the present invention for configuring hot keys. The method 220' is preferably used to perform the step 220 of the method 200. The method 220' is described in the context of the computer system 100. However, nothing prevents the use of the method 220' by another computer system.

The user optionally hovers the mouse over the item in the GUI corresponding to the desired function, via step 222. Thus, the use selects the function to which the hot key corresponds in step 222. In addition, the hot key configuration function 130 is also preferably activated in step 222. While holding down the <ALT> key, the user selects the combination of keys for the hot key, via step 224. In a preferred embodiment, step 224 determines the hot keys. In one embodiment, if the user presses an ASCII character in step 224, while holding the <ALT> key, the <ALT> and ASCII character are combined to form the hot key that is mapped to the function selected in step 222. If the user presses <SHIFT> and an ASCII character in step 224, while holding the <ALT> key, <ALT>-<SHIFT>-ASCII character combine to form the hot key that is mapped to the function selected in step 222. If the user presses a key modifier, such as the <CTRL>, Windows key, or <CTRL>-<SHIFT> and an ACII character in step 224, while holding the <ALT> key, then the key modifier and ASCII character combine to form the hot key that is mapped to the function selected in step 222. Thus, the <ALT> key has the lowest priority and is overridden by a key modifier. However, nothing prevents the use of another scheme for identifying the key combination for the hot key based upon the keys pressed in step 224.

Moreover, the hot key configuring function 130 also preferably accounts for any ambiguity in the key combinations selected, via step 226. Note that step 226 could be considered to implement the step 240 of the method 200 or be part of the method 220'. Both types of ambiguities described above are preferably accounted for in the step 226. Thus, step 226 ensures that a single combination is not mapped to two functions. In addition, step 226 ensures that the combination of keys depressed to activate the hot key configuring function 130 and map key combinations is not ambiguous. For example, in some contexts, the combination of <ALT> and an ASCII character might correspond to performing particular function. Thus, if the <ALT>-ASCII combination described above is depressed, the computer system 100 may not be able to determine whether <ALT>-ASCII character is to be used to execute the particular function or to map another function to the key combination. The hot key configuring function 130, therefore, would account for this ambiguity in step 226 or, as discussed above, step 240. In one embodiment, the ambiguity would be accounted for by mapping <ALT> in combination with an ASCII character to <CTRL> in combination with the ASCII character. In another embodiment, both <ALT> in combination with the ASCII character would be insufficient to activate the hot key configuring function. Instead, another criteria would be added. For example, the user might be required to perform the hover action described above in step 222 prior to the <ALT>-ASCII character combination to access the new function. However, where there is no ambiguity, the hover action may not be required.

The method 220' can be used for both text-based and non-text-based items. In the context of this application, text-based items are items that have text associated with them. For example, a text-based item could include a pull-down menu, a context menu, check boxes, radio buttons, or other items that have inherent and/or correlating text. In one embodiment, text-based items could have additional mechanisms in accordance with the present invention for configuring hot keys using the hot key configuring function 130.

Figure 6B:
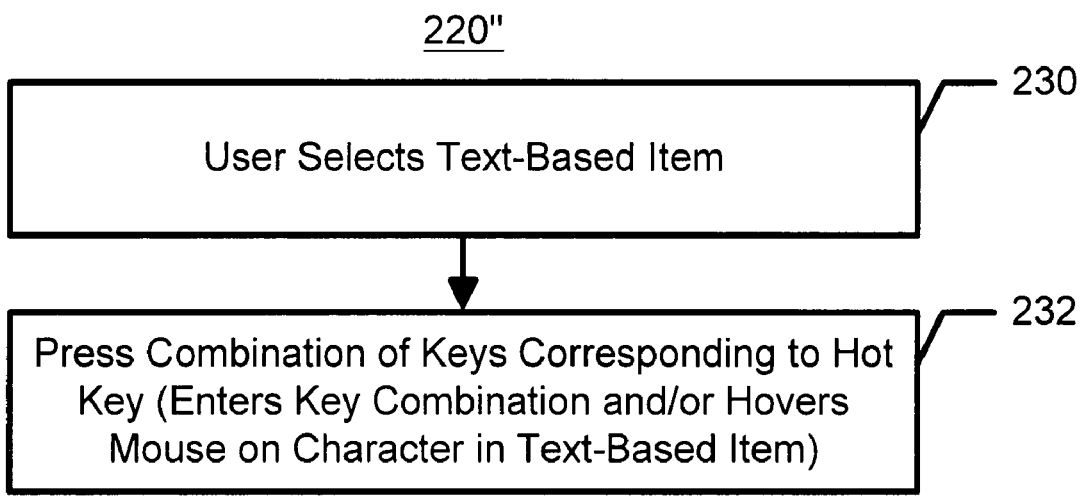
FIG. 6B is a more detailed flow chart of another embodiment of a method in accordance with the present invention for configuring hot keys.

FIG. 6B is a more detailed flow chart of another embodiment of a method 220 " in accordance with the present invention for configuring hot keys preferably for text-based items. Thus, the method 220" can be used to perform the step 220. In addition, the methods 220' and 220" can be combined to implement the step 220 of the method 200 of FIG. 4. Referring back to FIG. 6B, the method 220" is in the context of the computer system 100. However, nothing prevents the use of the method 220" by another computer system.

The user selects the text-based item, via step 230. For example, the user might place the pointer on one item of a pull down menu in step 230. The user then selects a key combination, via step 232. In one embodiment, the user holds the <ALT> key, or other key modifiers, while depressing some key combination. The <ALT> key, or other key modifiers, in combination with the key combination is the hot key mapped to the function corresponding to the item selected in step 232. In another embodiment, step 232 includes clicking the mouse on a letter in the text-based item while depressing the <ALT> key. In such an embodiment, the letter that was clicked will become underlined. Thus, the letter, preferably in combination with a key modifier such as a <CTRL>, becomes the hot key. In a preferred embodiment, the user may use either of the methods described above to select a key combination for the hot key of the text-based item.

Thus, using the methods 200, 210', 220', and/or 220" and/or the computer system 100, a user can configure hot keys without leaving the context in which he or she is working. Consequently, the efficiency of configuring of hot keys is improved.

A method and system has been disclosed for more efficiently configuring hot keys in a computer system. Software written according to the present invention is to be stored in some form of computer-readable storage medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a hot key corresponding to a particular function in a computer system, the computer system having a graphical user interface (GUI) and including a pointing device enabling a user to select items displayed in the GUI, the particular function provided for a context of an application program, the user providing input within the context, the method comprising the steps of:

integrating a hot key configuring function into the GUI such that a user can access the hot key configuring function from within the context and without leaving the context, wherein the context includes a displayed item displayed in the GUI corresponding to the particular function, and wherein the particular function is performed in response to the displayed item being selected by the pointing device; and mapping the hot key to the particular function and storing the mapping, the mapping and storing performed without the user leaving the context and in response to the user utilizing the hot key configuring function in the context, wherein the mapping causes the particular function to be accessed by the computer system when the mapped hot key is selected, and wherein the mapping includes:

receiving an indication of the particular function to which the hot key is to be mapped, the indication provided by the user moving the pointing device over the displayed item to indicate the particular function corresponding to the displayed item for the mapping, wherein the same displayed item is selectable by the pointing device to perform the particular function and is indicatable by the pointing device to indicate the particular function for the mapping; and receiving a key combination as the hot key in response to the user selecting the key combination using a hardware input device, the key combination being received after the indication of the particular function to which the hot key is to be mapped has been received.

2. The method of claim 1 further comprising the step of:
accounting for ambiguities in the receiving of the key combination such that the mapping of the particular function to the hot key is not confused with accessing a function previously mapped to the hot key.

3. The method of claim 1 wherein the pointing device includes a mouse, and wherein hot key configuring function integrating step further includes the steps of:
determining the plurality of items selectable in the context; and
providing a mechanism that maps at least one of the plurality of items to the hot key from the context without the user leaving the context.

4. The method of claim 3 wherein the hot key configuring function integrating step further includes the step of:
providing a mechanism that accounts for ambiguities between the hot key and a pre-existing hot key.

5. The method of claim 1 wherein the indication of the particular function using the pointing device over the displayed item does not cause the particular function to be performed.

6. The method of claim 5 wherein the indication of the particular function to which the hot key is to be mapped is provided by an action of the pointing device different than an action of the pointing device providing the selection of the displayed item to perform the particular function.

7. The method of claim 1 wherein the moving the pointing device over the displayed item to indicate the particular function includes the user hovering the pointing device over the displayed item for a predetermined amount of time, wherein the indication of the particular function for mapping does not include clicking the pointing device on the displayed item, and wherein the selection of the displayed item to perform the particular function includes clicking on the displayed item.

8. The method of claim 1 wherein mapping the hot key to the particular function without the user leaving the context includes receiving the indication of the particular function made by the user without the user providing input to a menu separate from the context.

9. The method of claim 8 wherein the context is a particular context, and wherein the application program has a plurality of different contexts which can each independently receive user input.

10. The method of claim 1 wherein the indicating of the particular function includes the user hovering a pointing device over a portion of the corresponding item in the GUI for a predetermined amount of time, and wherein the indication of the particular function for mapping does not include clicking the pointing device on the displayed item, and wherein the selection of the displayed item to perform the particular function includes clicking on the displayed item.

11. The method of claim 1 wherein the displayed item is a text-based item including displayed text, and wherein the indication of the particular function includes selecting a portion of the text of the corresponding item, the portion of the text being less than the entire displayed text of the displayed item.

12. The method of claim 11 wherein the indicating of the particular function for the mapping includes:
clicking on one letter of the text of the corresponding displayed item with the pointing device, wherein a key of the hardware input device that matches the one letter of the text is assigned as a portion of the hot key.

13. A computer-readable storage medium storing program instructions for providing a hot key corresponding to a particular function in a computer system, the computer system having a graphical user interface (GUI) and including a pointing device enabling a user to select items displayed in the GUI, the particular function provided for a context of an application program, the user providing input within the context, the program instructions for:

integrating a hot key configuring function into the GUI such that a user can access the hot key configuring function from within the context and without leaving the context, wherein the context includes a displayed item displayed in the GUI corresponding to the particular function, and wherein the particular function is performed in response to the displayed item being selected by the pointing device; and mapping the hot key to the particular function and storing the mapping, the mapping and storing performed without the user leaving the context and in response to the user utilizing the hot key configuring function in the context, wherein the mapping causes the particular function to be accessed by the computer system when the mapped hot key is selected, and wherein the mapping includes:

receiving an indication of the particular function to which the hot key is to be mapped, the indication provided by the user moving the pointing device over the displayed item to indicate the particular function corresponding to the displayed item for the mapping, wherein the same displayed item is selectable by the pointing device to perform the particular function and is indicatable by the pointing device to indicate the particular function for the mapping; and receiving a key combination as the hot key in response to the user selecting the key combination using a hardware input device, the key combination being received after the indication of the particular function to which the hot key is to be mapped has been received.

14. The computer-readable storage medium of claim 13 wherein the program further includes instructions for:
accounting for ambiguities in the receiving of the key combination such that the mapping of the particular function to the hot key is not confused with accessing a function previously mapped to the hot key 15. The computer-readable storage medium of claim 13 wherein the pointing device includes a mouse, and wherein hot key configuring function integrating instructions further includes instructions for:
  determining the plurality of items selectable in the context; and
  providing a mechanism that maps at least one of the plurality of items to the hot key from the context without the user leaving the context.

16. The computer-readable storage medium of claim 15 wherein the hot key configuring function integrating instructions further includes instructions for:
  providing a mechanism that accounts for ambiguities between the hot key and a pre-existing hot key.

17. The computer-readable storage medium of claim 13 wherein the indication of the particular function using the pointing device over the displayed item does not cause the particular function to be performed.

18. The computer-readable storage medium of claim 17 wherein the indication of the particular function to which the hot key is to be mapped is provided by an action of the pointing device different than an action of the pointing device providing the selection of the displayed item to perform the particular function.

19. The computer-readable storage medium of claim 13 wherein the moving the pointing device over the displayed item to indicate the particular function includes the user hovering the pointing device over the displayed item for at least a predetermined amount of time, and wherein the indication of the particular function for mapping does not include clicking the pointing device on the displayed item, and wherein the selection of the displayed item to perform the particular function includes clicking on the displayed item.

20. The computer-readable storage medium of claim 13 wherein mapping the hot key to the particular function without the user leaving the context includes receiving the indication of the particular function made by the user without the user providing input to a menu separate from the context.

21. The computer-readable storage medium of claim 13 wherein the displayed item is a text-based item including displayed text, and wherein the indication of the particular function includes selecting a portion of the text of the corresponding item, the portion of the text being less than the entire displayed text of the displayed item.

22. The computer-readable storage medium of claim 21 wherein the indicating of the particular function for the mapping includes:
  clicking on one letter of the text of the corresponding displayed item with the pointing device, wherein a key of the hardware input device that matches the one letter of the text is assigned as a portion of the hot key.

23. A computer system comprising:
  a hardware mechanism that provides an application, the application providing a context and having a particular function available therein, the particular function provided for a context of an application program, a user providing input within the context;
  a graphical user interface (GUI);
  a pointing device enabling a user to select items displayed in the GUI, wherein the context includes a displayed item displayed in the GUI corresponding to the particular function, and wherein the particular function is performed in response to the displayed item being selected by the pointing device; and
  a hot key configuring function integrated into the GUI such that a user can access the hot key configuring function from within the context and without leaving the context, the integrated hot key configuring function utilized by the user to designate a mapping of the hot key to the particular function and store the mapping without the user leaving the context, wherein the mapping causes the particular function to be accessed by the computer system when the mapped hot key is selected, and wherein the mapping is created by receiving an indication of the particular function to which the hot key is to be mapped and receiving a key combination as the hot key in response to the user selecting the key combination using a hardware input device, the key combination being received after the indication of the particular function to which the hot key is to be mapped has been received, wherein the indication is provided by the user moving the pointing device over the displayed item to indicate the particular function corresponding to the displayed item for the mapping, wherein the same displayed item is selectable by the pointing device to perform the particular function and is indicatable by the pointing device to indicate the particular function for the mapping.

24. The computer system of claim 23 wherein the integrated hot key configuring function further accounts for ambiguities in the receiving of the key combination such that the mapping of the particular function to the hot key is not confused with accessing a function previously mapped to the hot key.

25. The computer system of claim 23 wherein the pointing device includes a mouse, and wherein the hot key configuring function further determines the plurality of items selectable in the context and provides a mechanism that maps at least one of the plurality of buttons to the hot key from the context.

26. The computer system of claim 25 wherein the hot key configuring function further includes a mechanism that accounts for ambiguities between the hot key and a pre-existing hot key.

27. The computer system of claim 26 wherein the moving the pointing device over the displayed item to indicate the particular function includes the user hovering the pointing device over the displayed item for at least a predetermined amount of time, wherein the indication of the particular function for mapping does not include clicking the pointing device on the displayed item, and wherein the selection of the displayed item to perform the particular function includes clicking on the displayed item.

28. The computer system of claim 23 wherein the indication of the particular function using the pointing device over the displayed item does not cause the particular function to be performed.

29. The computer system of claim 28 wherein the indication of the particular function to which the hot key is to be mapped is provided by an action of the pointing device different than an action of the pointing device providing the selection of the displayed item to perform the particular function.

30. The computer system of claim 23 wherein the indication of the particular function is made by the user without the user providing input to a menu separate from the context.

31. The computer system of claim 23 wherein the displayed item is a text-based item including displayed text, and wherein the indicating of the particular function includes selecting a portion of the text of the corresponding item, the portion of the text being less than the entire displayed text of the displayed item.

32. The computer system of claim 31 wherein the indicating of the particular function for the mapping includes:
   clicking on one letter of the text of the corresponding displayed item with the pointing device, wherein a key of the hardware input device that matches the one letter of the text is assigned as a portion of the hot key.

* * * * *